United States Patent
Wang (10) Patent No.: US 7,660,933 B2
(45) Date of Patent: Feb. 9, 2010

(54) MEMORY AND I/O BRIDGE

(75) Inventor: Chun Wang, Markham (CA)

(73) Assignee: Broadcom Corporation, Irvine, CA (US)

( * ) Notice: Subject to any disclaimer, the term of this patent is extended or adjusted under 35 U.S.C. 154(b) by 80 days.

(21) Appl. No.: 11/871,120

(22) Filed: Oct. 11, 2007

(65) Prior Publication Data

US 2009/0100206 A1   Apr. 16, 2009

(51) Int. Cl.
*G06F 13/36* (2006.01)
(52) U.S. Cl. .................................. 710/310; 710/312
(58) Field of Classification Search ............... 710/306, 710/310, 312, 305
See application file for complete search history.

(56) References Cited

U.S. PATENT DOCUMENTS 6,330,630 B1 * 12/2001 Bell ........................... 710/312
7,107,371 B1 *  9/2006 Bell ........................... 710/104

* cited by examiner

*Primary Examiner*—Clifford H Knoll (74) *Attorney, Agent, or Firm*—McAndrews, Held & Malloy, Ltd.

(57) ABSTRACT

The present invention is directed to an improved memory and I/O bridge that provides an improved interface for communicating data between the data bus of the system processor and the memory controller. The memory and I/O bus bridge according to the present invention provides increased performance in the system. The memory and I/O bridge can include a deep memory access request FIFO to queue up memory access requests when the memory controller is busy. The memory and I/O bridge can include a memory write data buffer for holding and merging memory write operations to the same page of memory. The memory and I/O bridge can include a memory read data buffer for holding and queuing data and instructions read from memory, waiting to be forward to the data bus. The memory data read buffer can operate in one or more software selectable prefetch modes, which can cause one or more pages to be read in response to a single memory read instruction. The memory read data buffer can satisfy memory read request for data or instructions already held in the memory read buffer without reading the data or instructions from memory. The memory read data buffer can also provide for data coherency with respect the memory write data buffer and the external memory. The memory and I/O bridge can also include performance counters for tracking information about the performance of the memory and I/O bridge in order to tune the software operation and determine the optimum prefetch mode for a given application.

20 Claims, 4 Drawing Sheets

MEMORY AND I/O BRIDGE

BACKGROUND

A System on Chip or (SOC) design allows for the integration of many, if not all, of the components of a system onto a single chip design. These systems are known to have many benefits and advantages including simplifying the overall system design and reducing the chip interconnect requirements.

By way of example, a SOC can include an embedded processor such as a MIPS RISC core microprocessor which can communicate with memory and I/O devices using a memory and I/O bus. In some implementations, the SOC also includes an embedded Memory and I/O Bridge which interfaces the memory and I/O bus to a memory controller and an I/O controller. The embedded processor accesses memory using the memory and I/O bus to send memory access requests (memory read and memory write requests) to the memory controller to retrieve and store data in memory. Similarly, the embedded processor access other external or peripheral devices using the memory and I/O bus to send input and output (I/O) requests to the I/O controller.

SUMMARY

The present invention is directed to an improved memory and I/O bridge that provides for improved throughput for communicating data between the data bus of the system processor and the memory controller.

The memory and I/O bus bridge according to the present invention includes features that enhance the performance of the system and allow the system processor to operate at a high performance level. In accordance with the invention, the memory and I/O bridge is optimized for accessing memory and I/O device. The memory and I/O bridge according to the invention can include a deep memory request FIFO, a deep memory write buffer, separate read pre-fetch buffers for instruction and data and include software selectable pre-fetching algorithms. The memory and I/O bridge can also include mechanism for monitoring the performance of the bus bridge to enable the software to optimize the operation and performance of the memory and I/O bridge.

In accordance with implementations of the invention, one or more of the following capabilities may be provided. The memory bridge according to the invention allows memory access requests to be received and queued even then the memory controller is busy. The memory bridge allows for memory requests to be satisfied in the order that the data is available, which can be different from the order that the requests were received. The memory bridge allows for efficient writing of data by merging small blocks of data into larger blocks of data that can be written in burst fashion. The memory bridge allows for read pre-fetching so that subsequent read requests can be satisfied from data cached in the memory read data buffer, thus reducing memory read operations.

These and other capabilities of the invention, along with the invention itself, will be more fully understood after a review of the following figures, detailed description, and claims.

DETAILED DESCRIPTION OF PREFERRED EMBODIMENTS

The present invention is directed to an improved memory and I/O bridge that provides an improved interface for communicating data between the data bus of the system processor and the memory controller. The memory and I/O bus bridge according to the present invention provides increased performance in the system and allows the system processor to access data at high speed. In accordance with the invention, the memory and I/O bridge is optimized for accessing memory and I/O devices. The memory and I/O bridge according to the invention can include a deep request FIFO, a deep write buffer, separate read pre-fetch buffers for instruction and data and include software selectable pre-fetching algorithms. The memory and I/O bridge can also include mechanism for monitoring the performance of the bus bridge to enable the software to optimize the operation and performance of the memory and I/O bridge.

Figure 1:
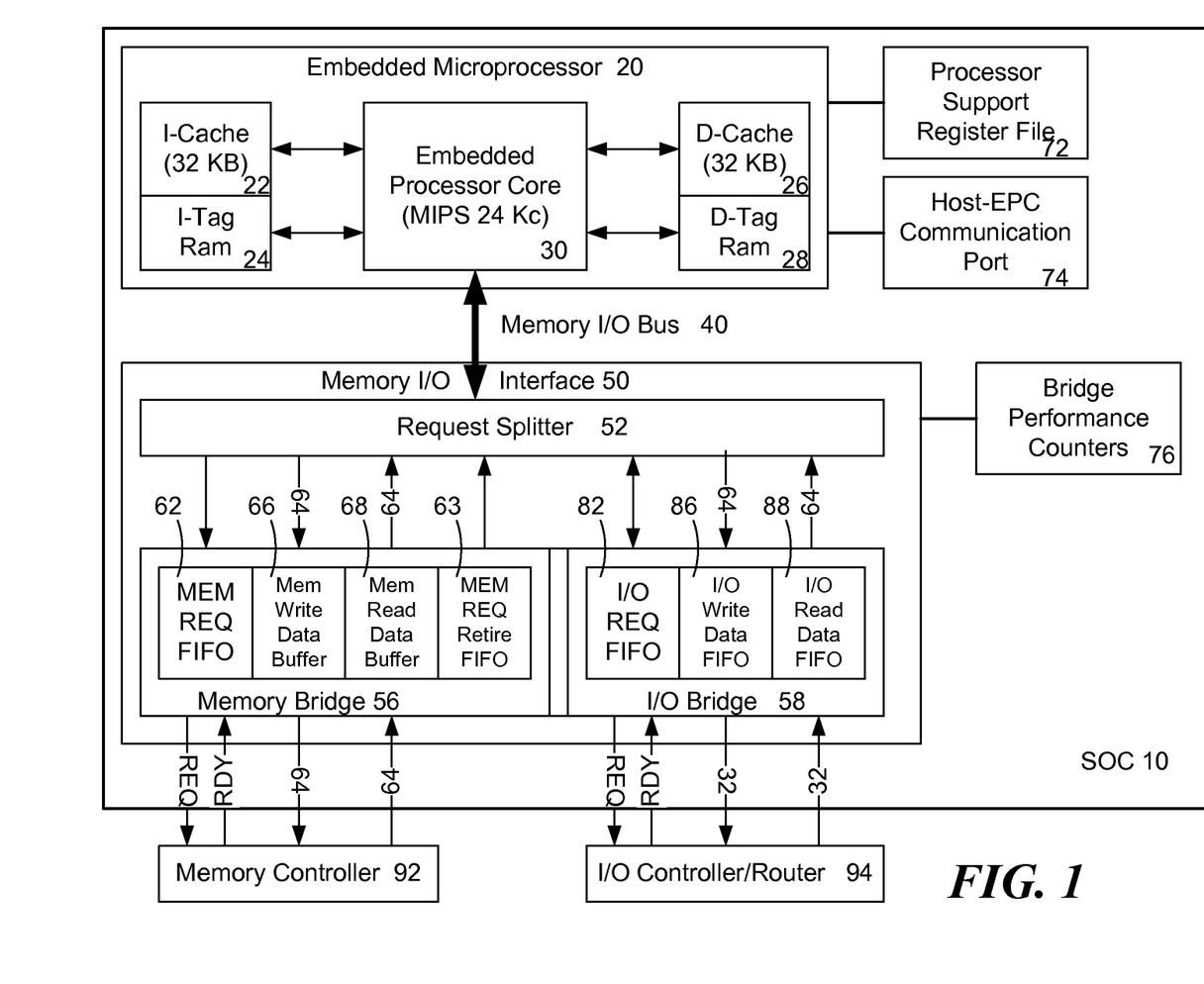
FIG. 1 is a block diagram of a DTV system on a chip which includes a memory and I/O bridge according to the invention.

FIG. 1 shows a block diagram of a system on a chip ("SOC") 10 that includes an embedded processor 20 and a memory I/O interface 50. The embedded processor system 20 can include an embedded processor core 30, such as a MIPS 24 Kc processor core available from MIPS Technologies, Mountain View, Ca. The embedded processor system 20 can include an instruction cache 22, instruction tag RAM 24, data cache 26 and data tag RAM 28, each connected to the embedded processor core 30 for transferring data and instructions. In addition, the embedded processor core 30 can access memory and I/O devices using a data bus 40. Data bus 40 can be, for example a MIPS EC bus or an Open Core Protocol ("OCP") bus. Information about the OCP specification is available from the OCP International Partnership of Beaverton, Oreg. The data bus 40 can be connected to memory and I/O interface 50 which interfaces the data bus 40 to a memory controller 92 and an I/O controller/router 94. The memory controller 92 can be connected to external memory devices (not shown), such as dynamic random access memory devices (DRAM). In one embodiment, the data path between the memory bridge 56 and the memory controller 92 can be 64 bits wide. The I/O controller/router 94 can be connected to external peripheral devices (not shown). In one embodiment, the data path between the I/O bridge 58 and the I/O controller/router 94 can be 32 bits wide.

In accordance with the invention, the memory and I/O interface 50 includes a request splitter 52, a memory bridge 56 and an I/O bridge 58. The request splitter 52 receives both memory access requests and I/O access requests from the data bus 40 and routes the memory access requests to the memory bridge 56 and the I/O access requests to the I/O bridge 58. In one embodiment, the request splitter 52 can separate data bus requests into memory access requests and I/O access requests according a programmable address range. The data paths between the request splitter 52 and the memory bridge 56 can be 64 bits wide. The data paths between the request splitter 52 and the I/O bridge 58 can be 64 bits wide.

In accordance with the present invention, the memory bridge 56 includes a memory request FIFO (first in first out memory) 62, a memory request retire FIFO 63 a memory write data buffer 66 and a memory read data buffer 68. In accordance with one embodiment of the invention, the memory bridge 56 provides an interface between the data bus 40 and the memory controller 92. Memory access requests from the embedded processor 30 can be queued in the memory request FIFO 62. Data to be written to external memory devices can be buffered in memory write data buffer 66 and Data being read from external memory devices can be buffered in memory read data buffer 68. The memory request retire FIFO 63 can be used to queue up memory read requests that can be satisfied by data held in the memory read data buffer 68 to control the flow data and instructions back to the embedded processor 30.

The memory request retire FIFO 63 can hold a pointer to the location in the memory read data buffer 68 where a block of data requested by the embedded processor 30 is held. The memory bridge 56 can satisfy memory read requests out of order by placing satisfied requests in the memory request retire FIFIO 63 as the data becomes available in the memory read data buffer 68. The memory bridge 56 also allows for pre-fetching of memory reads so that subsequent memory read requests can be satisfied from the memory read data buffer 68 in advance of memory read requests that require data to be read from external memory. This allows memory reads to be satisfied out of sequence.

In accordance with the present invention, the I/O bridge 58 includes an I/O request FIFO 82, an I/O write data FIFO 86 and an I/O read data FIFO 88. In accordance with one embodiment of the invention, the I/O bridge 58 provides an interface between the data bus 40 and the I/O controller/router 92. I/O access requests from the embedded processor 30 can be queued in the I/O request FIFO 82. Data to be written to external I/O devices can be queued in I/O write data FIFO 86 and Data being read from external I/O devices can be queued in I/O read data FIFO 88.

The memory bridge 56 can include features that enable it to maximize memory access bandwidth and reduce the memory access latency.

Figure 2:
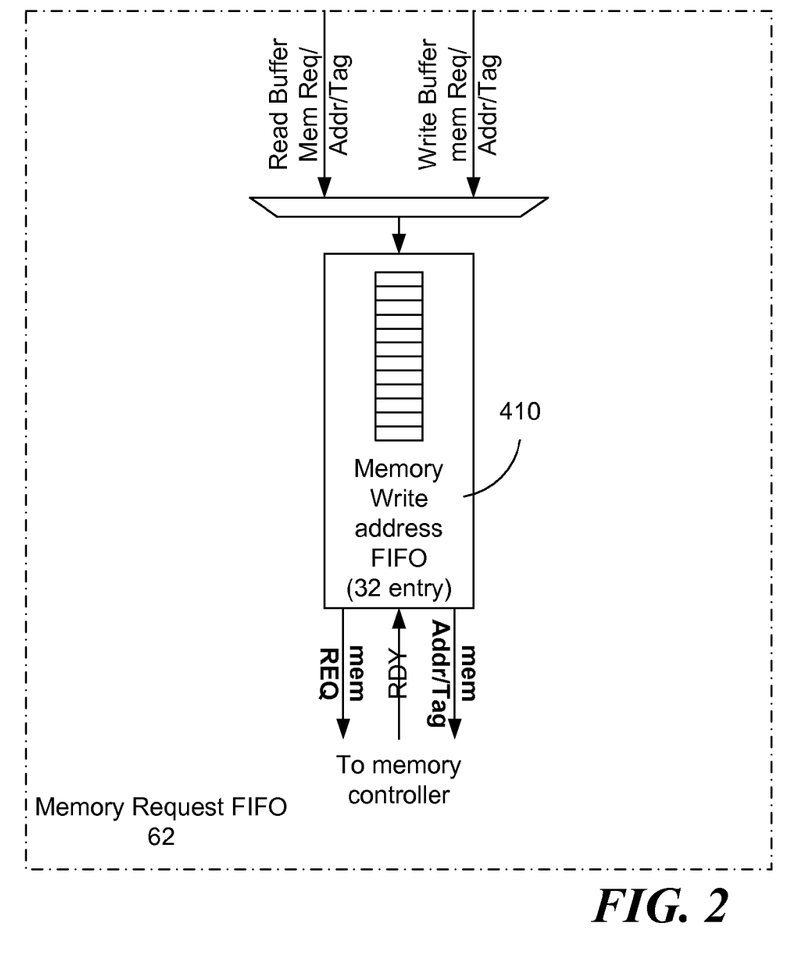
FIG. 2 is a block diagram of the memory request FIFO according to the invention.

FIG. 2 shows a diagram of the memory request FIFO 62 according to the invention. In one embodiment, the memory bridge 56 contains a 32 entry memory request FIFO 62 that can queue multiple (up to 32) memory requests (addresses). The memory request FIFO 62 allows the memory bridge 56 to accept multiple memory requests without stalling the memory I/O bus 40 when the memory controller 92 is busy and not servicing memory requests. Both memory read and memory write requests can be queued in the memory write address FIFO 410.

Figure 3:
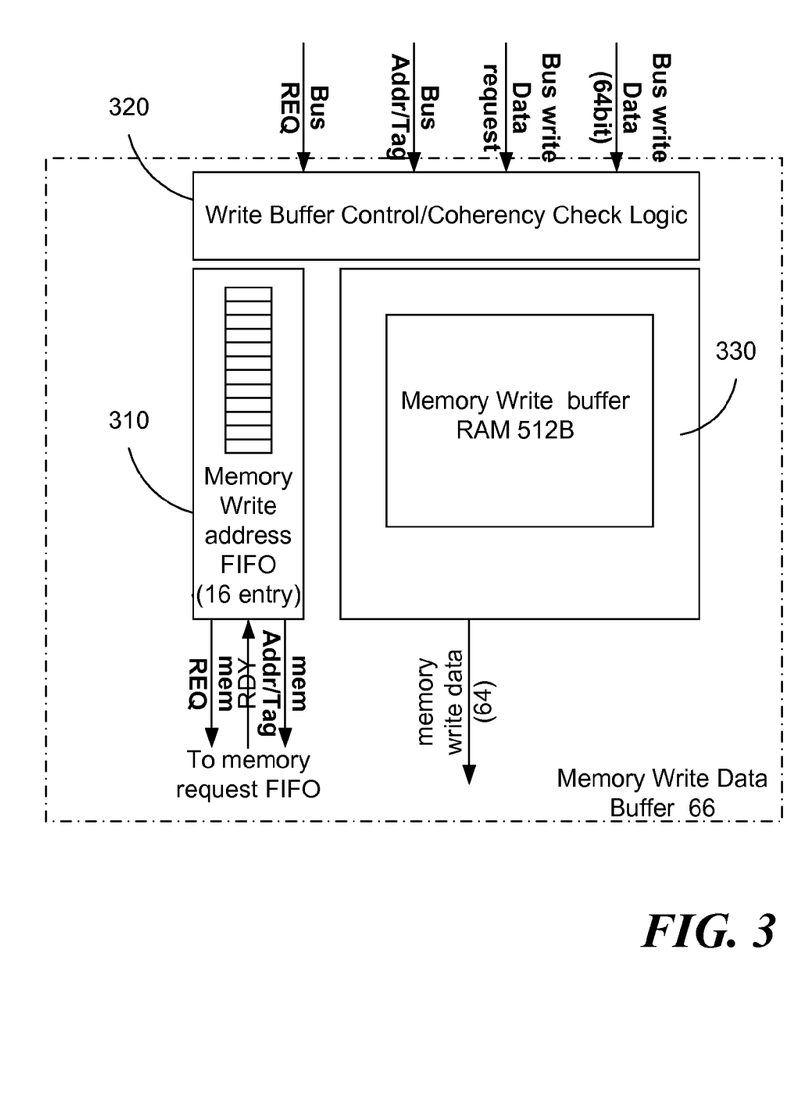
FIG. 3 is a block diagram of the memory write data buffer according to the invention.

FIG. 3 shows a diagram of the memory write data buffer 66. According to the invention, the memory bridge 56 can contain a memory write data buffer 66 that can hold memory write data before sending it to be written to memory. The memory write data buffer 66 can include a memory write address FIFO 310 to hold the memory address to be written to and a pointer to the location where the block of data to be written is held in the memory write buffer ram 330. The size of the memory write buffer ram 330 can be selected to accommodate the anticipated write data traffic of the embedded processor 30. In one embodiment, the memory write buffer ram 330 can hold 512 bytes. The memory write data buffer 66 can also include write buffer control/coherency check logic 320 which can control the operation of the memory write data buffer 66 and assist with data coherency of the data held in the memory write buffer 330, the memory read buffer 68 and external memory as described herein.

In one embodiment, the write data buffer 66 can include at least two functional modes of operation. In one mode of operation, write data buffer 66 can continue to accepting write data from the data bus 40 when the memory controller 92 is busy and cannot service the memory write request. In another mode of operation, write data buffer 66 can combine or merge short (single QWORD or 4 QWORDs bursts writes) write requests received from the data bus 40 into large (32 QWORDs—256 bytes) burst write operation before sending the write requests to memory controller. These memory burst write operations write large blocks of data to memory in a single operation and makes memory access more efficient.

In one embodiment, the actual memory storage of the memory write data buffer 66 can be 512 bytes. In this configuration, the write data buffer 66 can hold two 256 byte address aligned long burst memory write requests (256 bytes each), 16 32 byte unaligned short burst memory write requests (32 bytes each) or sixteen single QWORD unaligned memory write requests (8 bytes each) or any combination of the above three type of memory write requests with a total amount of data up to 512 bytes.

In order to maintain data coherency, the data in the write data buffer 66 can be flushed to main memory when (1) the write data buffer 66 accumulates 256 bytes of address aligned write data, (2) a new write request is not in the 256 bytes address aligned boundary of the data in the write data buffer 66, (3) a read request hit occurs for the same 256 byte address range of the data in the write buffer, or (4) when the embedded processor 30 issues an instruction requesting that write data buffer be synchronize or flushed to memory, such as when a MIPS SYNC instruction is executed. When a write data flush occurs, a write data request is sent to the memory request FIFO.

Figure 4:
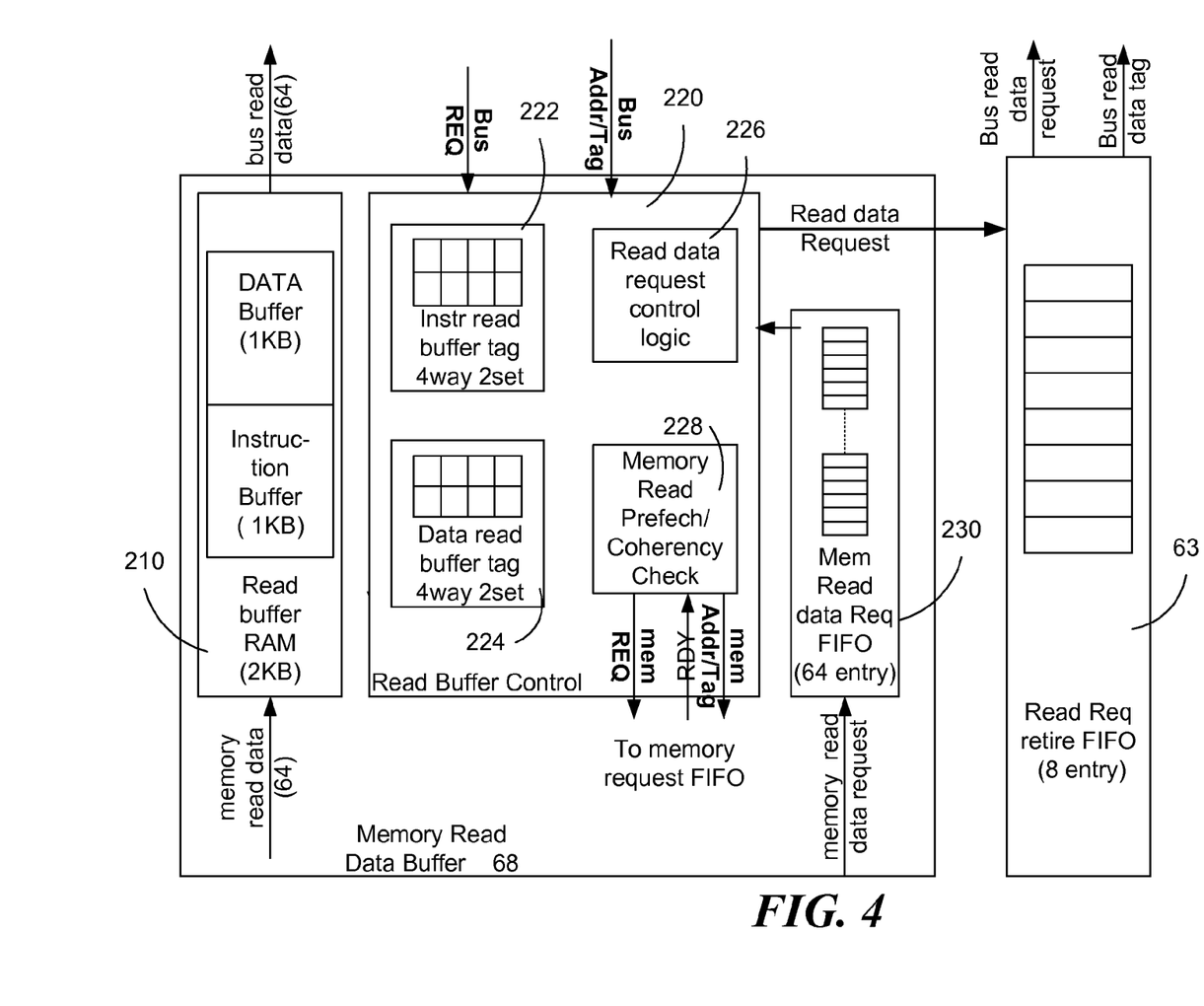
FIG. 4 is a block diagram of memory read data buffer according to the invention.

FIG. 4 shows a block diagram of a memory read data buffer 68 and read request retire FIFO 63 according to the invention. The memory read data buffer 68 can include a read buffer RAM 210, read buffer control logic 220, and a memory read data request FIFO 230. The read buffer RAM 210 can include a data buffer for storing data read from external memory and an instruction buffer for storing instructions from external memory. In one embodiment, the read buffer RAM 210 can hold 2K bytes, 1K bytes for Data and 1K bytes for processor instructions. The memory read data request FIFO 230 can be used to queue the memory read requests from the memory request FIFO 62. The memory read data buffer 68 can also include read buffer control logic that can control the operation of the memory read data buffer 68.

The read buffer control logic 220 can include instruction read buffer tag registers 222, data read buffer tag registers 224, read data request control logic 226 and memory read pre-fetch and coherency check logic 228. The instruction read buffer tag registers 222 and the data read buffer tag registers 224 hold information about the data and instructions held in the read buffer RAM 210. The instruction read buffer tag registers 222 and the data read buffer tag registers 224 can include two sets of four way associative registers to track the data and instructions stored in the read buffer RAM 210. The read data request control logic 226 can include control logic to control the operation of the memory read data buffer 68. The memory read pre-fetch and coherency check logic 228 can include control logic for performing pre-fetch operations and assisting in maintaining data coherency of the data held in the memory write data buffer 66, the read buffer RAM 210 and external memory as described herein.

In accordance with one embodiment of the invention, the memory bridge 56 can contain memory read data buffers 68 that can hold data read from main memory to be send via the data bus 40 to the embedded process or 30. The read data buffer 68 can contain multiple entries, each entry containing 128 bytes of data with the data address aligning on a 128 byte address boundary. The instruction and data entries can have separate entries in the read data buffer 68, for example, eight entries for instructions and eight entries for data. Total amount of storage of read buffer 210 can be 2048 bytes, 1024 bytes for instructions and 1024 bytes for data. Both instruction entries and data entries in the read data buffer 68 can be organized into two sets of 4 ways fully associative memories.

The memory bridge 56 can include one or more memory pre-fetching algorithms that can be controlled (enabled or disabled) by software. Different algorithms that are optimized for different type of data access patterns can be provided. One or more registers can be provided to control the selection and operation of the pre-fetch algorithm. In one embodiment, two register bits can be used to control the selection for different pre-fetch algorithms. For example, they can be PREFETCH_EN and PREFETCH_MODE.

In this embodiment, when pre-fetch is disabled (PREFETCH_EN=0), no pre-fetch operations are performed by the memory bridge 56. The memory request FIFO 62 can pass the memory read request (either single QWORD read or 4QWORD burst read) to the memory controller 92. The read data buffer 68 only receives the data (either single QWORD read or 4QWORD burst read) requested from the memory controller 92. The memory requests can be initiated and controlled by the read buffer control 220 and the read data request control logic 226.

In this embodiment, when pre-fetch is enabled (PREFETCH_EN=1). Each time the memory bridge 56 makes a request to the memory controller 92, instead of passing single QWORD read or 4QWORD burst read request to the memory controller, a 16 QWORD (128 bytes) burst read request is sent the memory controller 92. The 128 bytes of data received from memory controller can be stored in one entry of read buffer. From the 128 bytes of read data, either 8 bytes (single QWORD read) or 32 bytes (4QWORD burst read) of data are sent to the data bus 40 to complete the read operation requested by the embedded processor 30. The remainder of the data is stored in the read buffer entry as pre-fetch data. When subsequent read request from the embedded processor 30 falls within the address range of the 128 bytes of memory in the read buffer entry, a read buffer hit occurs and the read data is read out from the read buffer directly without accessing main memory. The memory requests can be initiated and controlled by the read buffer control 220, the read data request control logic 226 and the memory read pre-fetch and coherency check logic 228.

In an alternative embodiment, when pre-fetch is enabled, one extra 128 byte entry can be pre-fetched under certain conditions depending on the configuration setting of the PREFETCH_MODE. When PREFECH_MODE is set to 0, if during the current embedded processor 30 read request, the data requested is found in the read buffer (a read buffer hit), the memory bridge 56 can initiate the pre-fetch of one additional entry of read data the address beginning either 128 bytes before or after the current address. The memory bridge can keep track of historical memory usage and whether, for example, after the current memory read, whether subsequent memory reads access data in addresses before or after the current address range. The memory bridge 56 can then determine whether to pre-fetch 128 bytes before or after the current memory address based on the stored usage history for the current entry. If the usage history of current entry indicates an address increment, the pre-fetch address is 128 bytes after the current address range. If the usage history of the current entry indicates an address decrement, the pre-fetch address is 128 bytes before the current address range. A pre-fetch memory request will be generated only if the data does not exist in the read buffer. When a pre-fetch is required, a read buffer entry is allocated to hold the pre-fetch data and a read request is put in the memory request FIFO. The selection and destruction of a read buffer entry can be based on a least used entry algorithm. The memory requests can be initiated and controlled by the read buffer control 220, the read data request control logic 226 and the memory read pre-fetch and coherency check logic 228.

In accordance with the invention, when the PREFETCH_MODE is set to 1, in addition to the pre-fetching mechanism when PREFECH_MODE is set to 0, under certain conditions, the memory bridge 56 can trigger the pre-fetch of one extra memory entry. For example, if the current read request does not find the requested data in the read buffer (a read buffer miss), the memory bridge 56 can cause two entries (256 bytes) to be fetched, one for the address of that generate the read buffer miss and one for miss address plus 128 bytes.

The PREFETCH_EN and PREFETCH_MODE can be set differently for Instruction read requests and Data read requests as well as for cached data (burst read) and un-cached data (single read) to allow software to more fully optimize memory access for a specific application. This can be achieved through profiling of the application as described herein.

When the read data is available in the read data buffer 68, either because it was fetched from main memory or because it was already in the read buffer, a read data return request is generated to send the data over the data bus 40 to the embedded processor 30. Each read data return request can return data in either single QWORD (un-cached) units or 4 QWORD data burst (cached read) units. Since there could be multiple read data return requests active at the same time due to multiple outstanding read requests, a read data return request can be put onto the queue in the read request retire FIFO 63. The memory bridge 56 can read the read data return request from the read request retire FIFO 63 and take the data out of the read buffer 68 and send the read data over the data bus 40 to the embedded processor 30. In some embodiments, the embedded processor 30 can support having multiple read requests outstanding at any given time and can support receiving the read data return requests out of order. For example, the MIPS24Kc core can support a maximum of six outstanding read requests at one time and can receive the read data return requests out of order. In accordance with the invention, the order that the read data is returned to the embedded processor 30 may not be in the order of the read requests. For example, a later read request may get satisfied (and its data returned) quicker if the later requested data is already in the read buffer 68 (a read buffer hit). In accordance with one embodiment of the invention, the read data retire FIFO 63 can be 8 entries deep to accommodate the embedded processor having the ability support 6 out of order read data returns. As one of ordinary skill would appreciate, the read data retire FIFO 63 can be as large as necessary to accommodate the operation of the embedded processor 30 and preferably large enough to handle as many, if not more, outstanding read requests than the embedded processor 30.

Data coherency between read and write buffer.

The following algorithm can be used to maintain coherence of data in the read and write buffer.

When a read request hit occurs (the read address range is also held in an entry in the write buffer), the corresponding entry in the write data buffer is flushed to memory first, before making the read request from memory.

When a write request hit occurs (the write address range is also held in an entry in the read buffer), the corresponding entry in the read buffer is invalidated.

When an embedded processor synchronization instruction (e.g. a MIPS SYNC instruction) is executed, the entire read buffer can be invalidated if the register bit SYNC_FLUSH_EN bit is set to 1.

The I/O bridge 58 can pass the embedded processor 30 data I/O requests (memory requests that fall in the I/O address range) to the I/O controller/router 94. In one embodiment, the I/O bridge does not do any read data pre-fetching and write data merging. The I/O requests are put onto the I/O request FIFO 82. The original request order from the embedded processor 30 is preserved throughout the I/O bridge. The completion of the I/O requests is always in the order that the requests are received, no out of order completion is allowed for on the I/O requests.

The I/O request FIFO 82 can queue up multiple I/O requests when the I/O controller/router 94 is busy and not be able to accept new I/O requests. In one embodiment, the I/O request FIFO 82 can be 8 entries deep and can queue up to 8 I/O requests. In the queue, there could be eight single QWORD write requests, or two burst write requests or a single read request (single read or burst read) or any combination of the above three type of requests without exceeding total number requests of 8.

In accordance with one embodiment of the invention, the I/O write data FIFO can be 8 entries deep. Each entry can store one QWORD of write data, so the I/O write data FIFO can store data of 8 single QWORD write requests or two 4 QWORD burst write requests.

In accordance with one embodiment of the invention, the I/O read data FIFO can be 4 entries deep. Each entry can store one QWORD of read data. The I/O read data FIFO hold one read request worth of read data, for a single request, one entry is used and for a burst read request, all four entries are used. The I/O read data FIFO can queue up the read data returned from the I/O controller/router 94 if the embedded processor 30 or the data bus 40 is busy.

The processor support register file 72 can contain registers to configure the memory and I/O bridge for operation in specific operating modes. The processor support register file 72 can include registers to program the different prefetch modes for the read buffer, registers to control how the request splitter splits the bus address space into I/O and memory addresses and registers to enable and disable the bus bridge performance counters as well select the mode of operation of the performance counters.

Appendix A provides a description of various support registers that can be provided in accordance with the invention.

The host-EPC communication port 74 can be a special communication channel used to enable the embedded processor 30 to with an external host processor. The host-EPC communication port 74 can include two communication queues, one for sending information to external host processor and the other for receiving information from the external host processor. The queues can be provided by using SOC on chip registers in the Processor Support register file 74. The embedded processor 30 can communicates with the queues through I/O bridge 58. The external host processor can communicates with the queues through the SOC external host control bus such as PCI or I2C.

The SOC 10 can include a Bus Bridge Performance Counters 76 which can include six independent 32 bit counters that can be use to monitor the performance of the memory I/O interface 50. The performance counters allow the software developer to monitor the memory I/O interface 50 performance for their specific software applications so that the software can fine tuned the operating parameters of the memory I/O interface 50 to achieve maximum performance.

In one embodiment, the bus bridge performance counters can include six independent counters that can be programmed to monitor either the memory bridge performance or I/O bridge performance.

When programmed to monitor memory bridge performance. The following performance parameters can be monitored. The number of
Instruction read buffer hit
Instruction read buffer miss
Data read buffer hit
Data read buffer miss
Write buffer merge
Write buffer no merge When programmed to monitor I/O bridge performance the following performance parameters can be monitored. The number of
I/O memory read
I/O memory write
I/O register read
I/O register write In accordance with the invention, the memory bridge 56 can be used to optimize memory access for each individual application. This can be accomplished during the development of the individual application. In one embodiment, each application can be executed on the SOC 10 to monitor the performance of the application using each of the prefetch modes of operation. The bridge performance counter 76 and the processor support register file 72 can be used to collect data about the performance of the application operating in each of the different prefetch modes. This information can be used by the application software developer to optimize the organization and flow of the application and select the prefetch mode that provides the best performance.

The SOC 10 can contain many functional blocks, in addition to the blocks shown in FIGS. 1-4. Each block can include many control and configuration registers. The SOC 10 can include real time control software for monitoring and configuring these registers in order to implement the many different functions that the SOC is capable of providing. Because the performance of the control software is related to the overall operation and correct function of the SOC 10, improving the operation of the control software can improve the overall operation of the SOC 10.

The performance counters 76 in the bus bridge can be used to do profiling of any number of register reads and writes to determine 1) how many register read and write in a predefined period of time and 2) what is the ratio of register read and write. From the above information, an application developer or programmer can calculate how long and how often the control software was used to program or access the control registers. If the performance does not meet the developer's requirement, the developer can use the information from the performance counters 76 to determine how to reduce register access in the application in order to meet the performance requirements.

For example, if during operation of the application, the control software is used to perform many register read operations as indicated by a very high performance counter value for register read operations, the performance can normally be expected to be very poor because register read operations require many processor cycles (typically 40 to 50 cycles per read). During profiling, the performance registers would indicate high register read counts and this would be of assistance to the developer in examining the application program code to determine why there are so many read operations. For example, one common mistake is that some software applications, in operation, program a multi-field register, one field at a time. This process requires multiple read and write operations (read modify write) to complete the programming of a single register. Upon becoming aware of the high register read count, the developer could be alerted to the problem and change the software code to make sure a register is programmed in a single register write operation. The full register value should be pre-assembled in software instead of doing real time assembly using the read modified write operation.

Similarly, the bridge performance counters can be used to monitor I/O operations. The same optimization can also be performed for the I/O operations of the SOC 10 using the I/O read and write performance counter in the bridge performance counters 76. For example, the developer can monitor the SOC I/O bus read and write performance, such as PCI bus performance.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while the discussion above noted that the abrupt transitions between logical zero and logical one in the FB can be adjusted in time relative to the RGB and composite video signals, the gradual FB transitions can also, or alternatively, be adjusted in time relative to the RGB and composite video signals.

Further, while the description above refers to the invention, the description may include more than one invention.

APPENDIX A

Control registers in the control register file

| Field Name | Bits | Default | Description |
| --- | --- | --- | --- |
| MIPS_CNTL - RW - 32 bits - MMR0: 0x003810 | | | |
| COLD_RESET | 0 | 0x1 | MIPS peer mode cold reset. 1 = COLD_RESET 0=remove cold reset. Host can reset MIPS by writing COLD_RESET=1 && WARM_RESET=1 first and by writing COLD_RESET=0&&WARM_+RESET=0 |
| NMI_INT_EN | 2 | 0x0 | Enable HDTV2 interrupts contained in GEN_INT_STATUS route to MIPS NMI interrupt pin. 1=enable HDTV2 internal interrupts to route to MIPS NMI interrupt pin 0=disable HDTV2 internal interrupts to go to MIPS NMI interrupt pin |
| WARM_RESET | 4 | 0x1 | MIPS peer mode warm reset. 1=WRAM_RESET 1=remove warm reset. |
| EJ_PCI_EN | 8 | 0x0 | EJTAG port through PCI bus enable. 0 = The EJTAG port is accessible through chip EJTAG pins. 1 = The EJTAG port is accessible through register bits in MIPS_CNTL. |
| EJ_TRST_N | 9 | 0x1 | EJTAG reset. 0 = EJTAG is reset 1 = EJTAG is functional |
| EJ_TDO_TRI (R) | 10 | 0x1 | EJTAG data-out pin is tri-stated |
| EJ_DINT | 11 | 0x0 | EJTAG interrupt input |
| EJ_TCLK | 12 | 0x0 | EJTAG clock |
| EJ_TMS | 13 | 0x0 | EJTAG mode |
| EJ_TDI | 14 | 0x0 | EJTAG data input |
| EJ_TDO (R) | 15 | 0x0 | EJTAG data output |
| MIPS_PM_CNT_SEL | 17:16 | 0x0 | MIPS performance counters select. 0 = Counters will count cache HIT and MISS. 1 = Counters will count TLB HIT and MISS 0000=CACHE 0001=TLB |
| MIPS_PM_CNT_EN | 20 | 0x0 | MIPS performance counter enable. 0 = Stop performance counter 1 = Enable counter to count |
| MIPS_PM_CNT_CLR (W) | 21 | 0x0 | MIPS performance counter disable and clear. 0 = no action. 1 = clear |
| MIPS_MERGE_MODE | 24 | 0x0 | 0000=No merge 0001=Full merge |
| MIPS_EB_BLKTYPE | 25 | 0x1 | 0000=Sequential addressing 0001=Sub block ordering |
| MIPS_XXR_DEBUG_EN | 28 | 0x0 | |
| MIPS_MEMINTF_CNTL1 - RW - 32 bits - MMR0: 0x00383C | | | |
| IRBUF_UNCACHED_PREFETCH_MODE | 0 | 0x1 | Uncached Instruction read prefetch mode |
| IRBUF_UNCACHED_PREFETCH_EN | 1 | 0x1 | Uncached Instruction read prefetch enable |
| IRBUF_CACHED_PREFETCH_MODE | 2 | 0x1 | Cached Instruction read prefetch mode |
| IRBUF_CACHED_PREFETCH_EN | 3 | 0x1 | Cached Instruction read prefetch enable |

APPENDIX A-continued

Control registers in the control register file

| Field Name | Bits | Default | Description |
|---|---|---|---|
| DRBUF_UNCACHED_PREFETCH_MODE | 4 | 0x1 | Uncached data read prefetch mode |
| DRBUF_UNCACHED_PREFETCH_EN | 5 | 0x1 | Uncached data read prefetch enable |
| DRBUF_CACHED_PREFETCH_MODE | 6 | 0x1 | Cached data read prefetch mode |
| DRBUF_CACHED_PREFETCH_EN | 7 | 0x1 | Cached data read prefetch enable |
| IRBUF_SYNC_FLUSH_EN | 8 | 0x0 | Instruction read buffer sync invalidate enable |
| DRBUF_SYNC_FLUSH_EN | 12 | 0x0 | Data read buffer sync invalidate enable |

MIPS_SYSTEM_APERTURE_BASE - RW - 32 bits - MMR0: 0x003808

| Field Name | Bits | Default | Description |
|---|---|---|---|
| APERTURE | 3:1 | 0x3 | Aperture Size.<br>0 = 16 MB<br>1 = 32 MB<br>2 = 64 MB<br>3 = 128 MB<br>4 = 256 MB |
| BASE_ADDRESS | 31:24 | 0x0 | Defines the base address of an aperture, in MIPS physical address space, where the SDRAM resides. |

MIPS System-Memory Aperture Control Register used by the request spliter to determine which bus request should go to memory bridge which request should go to I/O bridge.
Defines an aperture, in MIPS physical address space, where the bus address fall in the memory controller address range.

BUS_PM_D_Hit - RW - 32 bits - MMR0: 0x003818

| Field Name | Bits | Default | Description |
|---|---|---|---|
| BUS_PM_D_Hit (R) | 31:0 | 0x0 | Data prefech buffer hit count or I/O data read hit count the MIPS_PM_CNT_SEL bit in the MIPS_CNTL register. |

BUS Performance Counter1.
Data prefech buffer hit count or I/O data read hit count the MIPS_PM_CNT_SEL bit in the MIPS_CNTL register.

BUS_PM_D_Miss - RW - 32 bits - MMR0: 0x00381C

| Field Name | Bits | Default | Description |
|---|---|---|---|
| BUS_PM_D_Miss (R) | 31:0 | 0x0 | Data miss count or I/O data write count depending on the MIPS_PM_CNT_SEL bit in the MIPS_CNTL register. |

BUS Performance Counter2.
Data miss count or I/O data write count depending on the MIPS_PM_CNT_SEL bit in the MIPS_CNTL register.

BUS_PM_I_Hit - RW - 32 bits - MMR0: 0x003820

| Field Name | Bits | Default | Description |
|---|---|---|---|
| BUSPM_I_Hit (R) | 31:0 | 0x0 | Instruction prefetch buffer hit count or Register I/O read count depending on the MIPS_PM_CNT_SEL bit in the MIPS_CNTL register. |

BUS Performance Counter3.
Instruction prefetch buffer hit count or Register I/O read count depending on the MIPS_PM_CNT_SEL bit in the MIPS_CNTL register.

BUS_PM_I_Miss - RW - 32 bits - MMR0: 0x003824

| Field Name | Bits | Default | Description |
|---|---|---|---|
| MIPS_PM_ICacheMiss (R) | 31:0 | 0x0 | instruction prefetch buffer miss count. |

MIPS Performance Counter4.
Instruction_prefetch buffer miss count or Register I/O write count depending on the MIPS_PM_CNT_SEL bit in the MIPS_CNTL register.

BUS_PM_WTBMerge - RW - 32 bits - MMR0: 0x003828

| Field Name | Bits | Default | Description |
|---|---|---|---|
| BUS_PM_WTBMerge (R) | 31:0 | 0x0 | write buffer merge count. |

BUS Performance Counter5.
Write buffer merge count.

BUS_PM_WTBNoMerge - RW - 32 bits - MMR0: 0x00382C

| Field Name | Bits | Default | Description |
|---|---|---|---|
| BUS_PM_WTBNoMerge (R) | 31:0 | 0x0 | write buffer no-merge count. |

BUS Performance Counter6.
Write buffer no-merge count.

Host-EPC communication registers

| Field Name | Bits | Default | Description |
|---|---|---|---|

HM_COM_CNTL - RW - 32 bits - General Purpose XCLK range: 0x0

| Field Name | Bits | Default | Description |
|---|---|---|---|
| HM_COM_PORT_EN | 0 | 0x0 | HM_COM_PORT Enable. Enable =1. When disabled, HM_WB_EMPTY =1, HM_RB_VALID=0, HM_WB_VALID=0, HM_RB_EMPTY = 1. |
| HM_WB_EMPTY | 8 | R | Host to MIPS write buffer is empty, it initialized to 1 it will bOCPomes zero when host write data into the write buffer and will bOCPome one again when MIPS read the data from the write buffer |

-continued

Host-EPC communication registers

| Field Name | Bits | Default | Description |
|---|---|---|---|
| _VALID | 9 | R | Host to MIPS read buffer is valid. It will be initialized to 0. It will bOCPome one when MIPS write data into the host read buffer. |
| HM_WB_VALID | 12 | R | Host to MIPS write buffer is valid |
| HM_RB_EMPTY | 13 | R | Host to MIPS read buffer is empty |
| HM_WB_EMPTY_INT_EN | 16 | 0 | Host write buffer empty interrupt enable(interrupt will be generate to host processor) |
| HM_RB_VALID_INT_EN | 17 | 0 | Host read buffer valid interrupt enable(interrupt will be generate to the host processor) |
| HM_WB_VALID_INT_EN | 20 | 0 | Host write buffer valid interrupt enable(interrupt will be generate to MIPS processor) |
| HM_RB_EMPTY_INT_EN | 21 | 0 | Host rd buffer empty interrupt enable(interrupt will be generate to MIPS processor) |
| HM_COM_DATA_W - W - 32 bits - General Purpose XCLK: 0x4 | | | |
| HM_COM_DATA_W | 31:0 | | Host data send to MIPS |
| HM_COM_DATA_R - W - 32 bits - General Purpose XCLK: 0x8 | | | |
| HM_COM_DATA_R | 31:0 | | MIPS data send to HOST |

What is claimed is:

1. A system on a chip, comprising:
an embedded microprocessor that comprises a first type of cache, a second type of cache, a first type of RAM, a second type of RAM and an embedded processor core;
a data bus coupled to the embedded microprocessor; and
an interface coupled to the data bus, the interface configured to receive data bus requests from the data bus,
wherein the data bus requests comprises memory access requests and I/O access requests,
wherein the interface comprises a request splitter, a memory bridge and an I/O bridge,
wherein the embedded processor core accesses a memory that is external to the system on the chip and I/O devices that are external to the system on the chip through the data bus and the memory bridge,
wherein the request splitter receives the memory access requests and the I/O access requests from the data bus and routes the memory access requests and the I/O access requests to the memory bridge and the I/O bridge,
wherein the request splitter separates data bus requests into the memory access requests and the I/O access requests according to a programmable address range,
wherein the memory bridge comprises a first type of FIFO, a second type of FIFO, a first type of buffer and a second type of buffer,
wherein the memory bridge is coupled to a memory controller that is external to the system on the chip,
wherein the I/O bridge comprises a third type of FIFO, a fourth type of FIFO and a fifth type of FIFO, and
wherein the I/O bridge is coupled to an I/O controller that is external to the system on the chip.

2. The system according to claim 1, wherein the first type of RAM is an instruction tag RAM, wherein the second type of cache is a data tag RAM, wherein the first type of cache is an instruction cache and wherein the second type of cache is data cache.

3. The system according to claim 1, wherein communications between the memory bridge and the memory controller is a first number of bits wide, and wherein the communications between the I/O bridge and the I/O controller is a second number of bits wide, the second number being half the first number.

4. The system according to claim 3, wherein the communications between the request splitter and the memory bridge is the first number of bits wide, and wherein the communications between the request splitter and the I/O bridge is the first number of bits wide.

5. The system according to claim 1, wherein the third type of FIFO is an I/O request, wherein the fourth type of FIFO is an I/O write data FIFO and wherein the fifth type of FIFO is an I/O read data FIFO.

6. The system according to claim 1, wherein the first type of FIFO is a memory request FIFO, wherein the second type of FIFO is memory request retire FIFO, wherein the first type of buffer is a memory write data buffer and wherein the second type of buffer is a memory read data buffer.

7. The system according to claim 6, wherein the memory access requests received by the request splitter are queued in the memory request FIFO, and wherein memory request retire FIFO is used to queue up memory read requests that can be satisfied by data held in the memory read data buffer ton control a flow of data and instructions back to the embedded processor.

8. The system according to claim 6, wherein the memory bridge satisfies out-of-order memory read requests by placing satisfied requests in the memory request retire FIFO as data becomes available in the memory read data buffer.

9. The system according to claim 6, wherein the memory bridge performs pre-fetching of memory reads so that subsequent memory read requests can be satisfied from the memory read data buffer in advance of the memory read requests for data in a memory that is external to the system on the chip.

10. The system according to claim 6, wherein the memory request FIFO allows the memory bridge to accept multiple memory requests without stalling the data bus when the memory controller is busy and not servicing the memory requests.

11. The system according to claim 6, wherein the memory write data buffer has a first functional mode of operation and a second functional mode of operation.

12. The system according to claim 11, wherein, in the first function mode of operation, the memory write data buffer continues accepting write data from the data bus when the memory controller is busy and cannot service the memory write requests, and wherein, in the second functional mode of operation, the memory write data buffer merges the memory write requests received from the data bus into larger memory write operations before sending the memory write requests to the memory controller.

13. The system according to claim 1, wherein the memory bridge performs different pre-fetching algorithms that are optimized for different types of data access patterns.

14. The system according to claim 13, wherein the different pre-fetching algorithms are software selectable.

15. The system according to claim 1, comprising a plurality of independent bit counters coupled to the interface, wherein the plurality of independent bit counters are used to monitor performance of the interface.

16. The system according to claim 1, wherein the memory controller is coupled to a RAM that is external to the system on the chip.

17. The system according to claim 6, wherein data stored in the memory write data buffer is flushed to maintain data coherency.

18. The system according to claim 6, wherein the memory write data buffer can be configured to hold address aligned long burst memory write requests, unaligned short burst memory write requests and QWORD unaligned memory write requests.

19. The system according to claim 1, comprising a processor support register file that is coupled to the embedded processor, wherein the processor support register file comprises registers used to configure memory bridge and the I/O bridge.

20. The system according to claim 1, comprising a communications port that is coupled to the embedded processor, wherein the communications port provides a communications channel between the embedded processor and a host processor, wherein the host processor is external to the system on the chip.

* * * * *